United States Patent [19]
Gasser et al.

[11] Patent Number: 5,715,741
[45] Date of Patent: Feb. 10, 1998

[54] POT-SHAPED PERMANENT FILTER INSERT

[75] Inventors: Ruedi Gasser, Bürglen; Ernst Stumvoll, Sarnen, both of Switzerland

[73] Assignee: MAXS AG, Sachseln, Switzerland

[21] Appl. No.: 702,612

[22] PCT Filed: Mar. 3, 1995

[86] PCT No.: PCT/EP95/00788

§ 371 Date: Oct. 24, 1996

§ 102(e) Date: Oct. 24, 1996

[87] PCT Pub. No.: WO95/23543

PCT Pub. Date: Sep. 8, 1995

[30] Foreign Application Priority Data

Mar. 3, 1994 [DE] Germany ............... 94 03 615 U
Jul. 19, 1994 [DE] Germany ............... 44 25 494.6

[51] Int. Cl.⁶ .............. A47J 31/00; A47J 31/06; A47J 31/30; A47J 37/00
[52] U.S. Cl. .............. 99/295; 99/302 R; 99/415; 99/418; 99/322; 210/455; 210/477; 210/481
[58] Field of Search ............... 99/290, 294, 295, 99/289 R, 302 C, 302 R, 302 P, 280, 282, 286, 281, 285–287, 291, 303, 316–323, 410–418; 210/482, 498, 455, 481, 251, 247, 413, 771, 477; 426/112, 77, 433, 435, 394

[56] References Cited

U.S. PATENT DOCUMENTS

| | | | |
|---|---|---|---|
| 1,718,170 | 6/1929 | Merkle. | |
| 4,137,833 | 2/1979 | Yelloz | 99/293 |
| 4,644,856 | 2/1987 | Borgmann | 210/481 |
| 5,008,013 | 4/1991 | Favre et al. | 99/295 |
| 5,127,318 | 7/1992 | Selby, III | 99/295 |
| 5,133,983 | 7/1992 | Greiwe | 426/433 |
| 5,197,374 | 3/1993 | Fond | 99/300 X |
| 5,326,472 | 7/1994 | Combe | 210/455 |
| 5,340,471 | 8/1994 | Wilson et al. | 99/418 X |
| 5,343,799 | 9/1994 | Fond | 99/302 R |
| 5,447,631 | 9/1995 | Mahlich | 210/455 |
| 5,496,573 | 3/1996 | Tsuji et al. | 210/508 |
| 5,526,733 | 6/1996 | Klawuhn et al. | 99/289 R |
| 5,582,731 | 12/1996 | Gianfranco | 210/481 X |

FOREIGN PATENT DOCUMENTS

| | | | |
|---|---|---|---|
| 72 949 | 9/1960 | France. | |
| 2 143 951 | 2/1973 | France | A47J 31/00 |
| 2 158 306 | 6/1973 | France | A47J 31/00 |
| 2 387 623 | 11/1978 | France | A47J 31/30 |
| 2 417 963 | 9/1979 | France | A47J 31/06 |
| 2 481 609 | 11/1981 | France | A47J 31/06 |
| 30 35 157 | 4/1982 | Germany | A47J 31/00 |
| 41 35 660 | 5/1992 | Germany | A47J 31/06 |
| 434 629 | 11/1967 | Switzerland | A47J 31/06 |
| L19311 | 7/1912 | United Kingdom. | |

Primary Examiner—Timothy F. Simone
Attorney, Agent, or Firm—Tilton, Fallon, Lungmus & Chestnut

[57] ABSTRACT

The present invention relates to a pot-shaped permanent filter insert for use in an espresso machine, the insert comprising a filter base plate which substantially forms the bottom of the pot and is penetrated by a plurality of filter openings substantially in the flow direction of the medium to be filtered and comprises a frame surrounding the filter base plate, and a pot wall which is substantially arranged on the edge of the filter base plate and transversely extends away from the filter base plate to form a coffee receiving portion, the permanent filter insert being made of a plurality of parts in that the lower edge portion of the pot wall is substantially secured to the outer edge of the filter base plate. Furthermore, the lower edge portion of the pot wall and the filter base plate are interconnected by an injection-molded plastic connection, a frame being injection-molded substantially around the outer edge of the filter base plate, interconnecting the frame and the filter base plate and the pot wall.

47 Claims, 11 Drawing Sheets

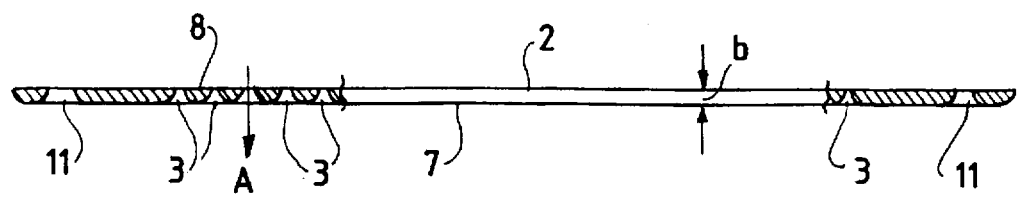
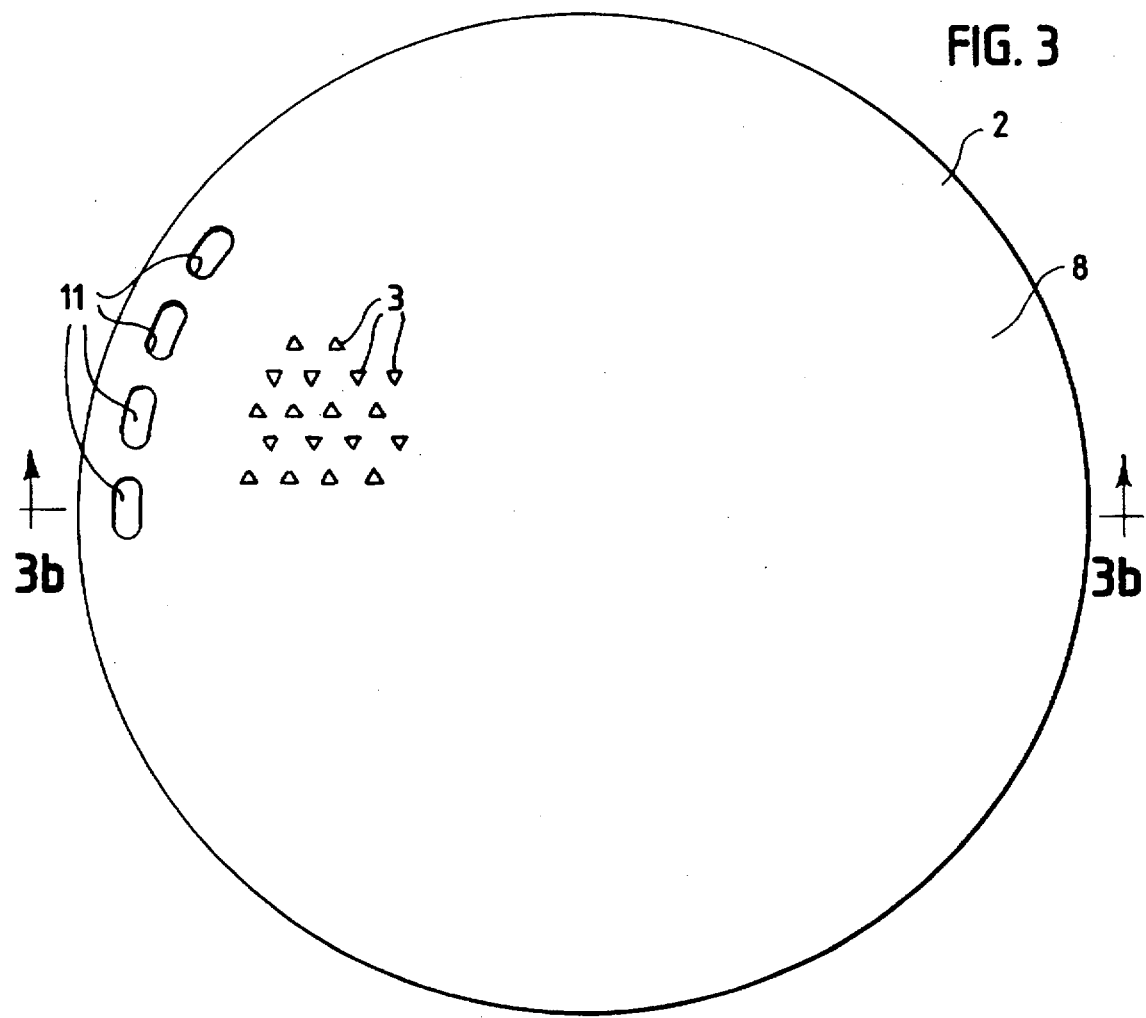

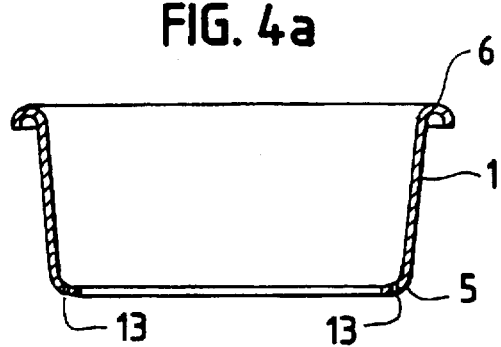
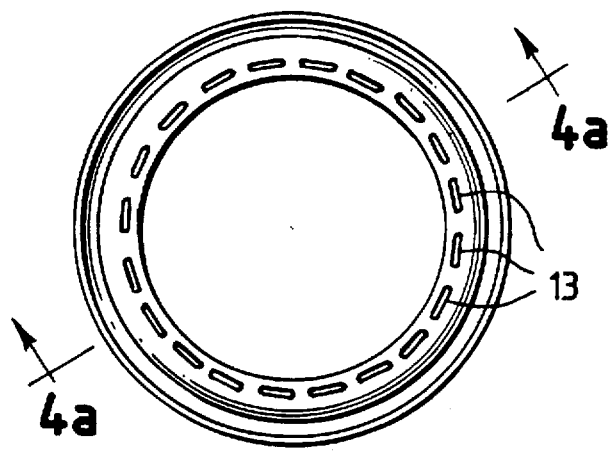
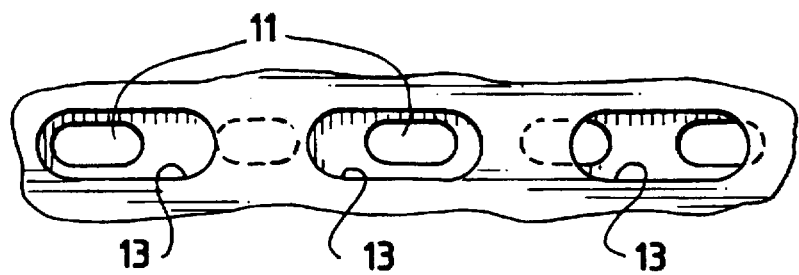

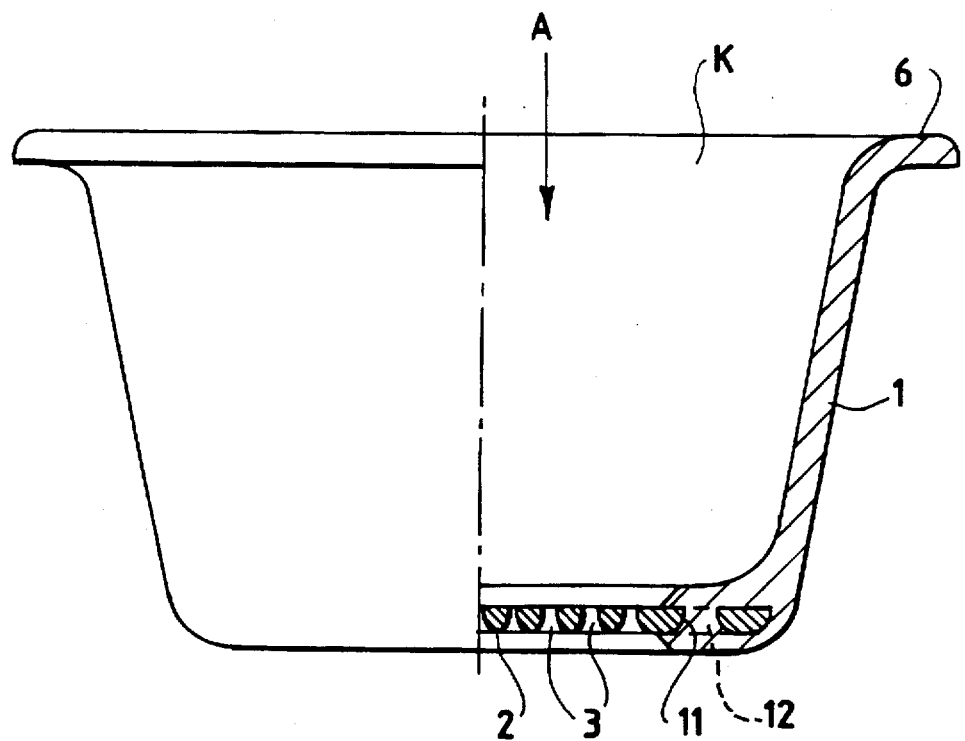

POT-SHAPED PERMANENT FILTER INSERT

The present invention relates to a pot-shaped permanent filter insert for use in an espresso machine, comprising a filter base plate which substantially forms the bottom of the pot and which is penetrated by a plurality of filter openings substantially in the flow direction of the medium to be filtered and comprises a frame surrounding the filter base plate, and a pot wall which is substantially arranged on the edge of the filter base plate and transversely extends away from the filter base plate to form a coffee receiving portion, the permanent filter insert being made of a plurality of parts in that the lower edge portion of the pot wall is substantially secured to the outer edge of the filter base plate.

U.S. Pat. No. 1,718,170 discloses a coffee machine which comprises a filter pot whose bottom is formed by a filter plate. The filter plate is surrounded by a frame which is supported and mounted on a surrounding collar which is provided on the lower portion of the filter pot. Such filter pots are not suited for use in an espresso machine because vapor is passed through at relatively high pressures in an espresso machine. This is the reason why in an embodiment according to U.S. Pat. No. 1,718,170 particle residues of the ground coffee would accumulate very rapidly in the contact portions between pot wall or collar and frame of the filter plate, and the espresso flavor would be impaired if the machine were not permanently and correctly cleaned.

It is therefore the object of the present invention to provide a pot-shaped permanent filter insert of improved structure for use in an espresso machine.

According to the invention this object is achieved in that the lower edge portion of the pot wall and the filter base plate are interconnected by an injection molded connection. An injection molded connection has the advantage that the connection point may have any desired shape and that open gaps are avoided. Furthermore, a frame is provided in such a case by performing an injection molding or die casting prcoess substantially around the outer edge of the filter base plate. The frame then interconnects the filter base plate and the pot wall. This ensures that the filter base plate is positioned permanently and sealingly. Furthermore, pot wall and filter base plate may be interconnected in a single injection molding process or in a die casting process.

Although FR-A-2143951 and FR-A-2417963 disclose permanent filters for use in a coffee machine whose filter plate is connected to a pot wall in a plastic injection molding process, these documents do not disclose why such a design should be usable for espresso machines at the higher pressures inherent thereto, since so far use has always been made in espresso machines of pot-shaped permanent filter inserts that have been produced by deep-drawing sheet metal, and whose filter openings are molded into the bottom of the pot by punching holes. In the opinion of the experts it has only been in this way that an adequate stability could be achieved.

In another variant, the lower edge portion of the pot wall and the filter base plate are interconnected by means of a metal die-casting connection, preferably aluminum or zinc die casting. In this case, too, the connection point may have any desired shape.

Other preferred connections of the lower edge portion of the pot wall and the filter base plate are connections by means of welding, adhesion, rolling, soldering or bending.

An especially advantageous design is obtained when the lower edge portion comprises at least one fastening element for reception in the frame. The plastic material is then flush with the fastening element, whereby the pot wall is fixedly retained by the frame. It is here of advantage when the fastening element is shaped as a collar which surrounds the lower edge portion of the pot wall and is oriented towards the axis of the pot. Especially with pot walls of metal, preferably stainless steel, such a fastening element can be produced by a simple deep-drawing process for the lower edge portion of the pot wall.

The pot wall can also be made in a metal die-casting process and may consist of metal, preferably of aluminum or zinc or alloys thereof.

In another preferred embodiment the pot wall may be made from a plastic material. This may especially be of advantage in cases where the pot wall and the frame are made integral, whereby they can be jointly mounted on the filter base plate in a single injection molding process.

In another embodiment the filter openings may have a triangular shape when viewed in cross section. When taking a look at the flow pattern through such a triangular opening, one will notice that particles which are located quite close to the corners of the opening must withstand considerably greater frictional forces than flow particles which are rather positioned in the center portion of the opening. This phenomenon is enhanced in a triangle, especially because of the fact that the flow particles are confined in the corners by two sides at a relatively acute angle. Upon passage swirls will be created forming an especially fine and creamy foam which effects an excellently formed head or cream on an espresso that is very much liked by connoisseurs. An equilateral triangle is a preferred shape.

In another preferred embodiment the filter openings may have a circular shape when viewed in cross-section, the circular shape being producible in an especially simple manner and with dimensional accuracy. Other preferred developments are shapes in the form of lenses or drops.

Furthermore, a design of the filter openings where the openings become larger in the manner of a funnel from the upper side of the filter base plate in flow direction to the bottom side of the filter base plate has turned out to be especially advantageous with respect to flow, whereby the formation of a desired head or cream is promoted. It is here of advantage when the angle of exit of the lateral surfaces of the filter openings is at least 90° at the bottom side of the filter base plate. Furthermore, it is especially advantageous when the lateral surfaces of the filter openings are curved in the manner of an arc, whereby they are given an advantageous nozzle-like structure. Preferred dimensions by which an especially fine cream formation is made possible have turned out to be dimensions in the case of which the side length of the filter openings is 50 to 300 µm, preferably about 200 µm, on the upper side of the filter base plate. To provide the filter openings with an advantageous length to this end, the filter base plate may preferably have a thickness of from 0.1 to 1 mm, preferably 0.4 mm.

When circular filter openings are used, the diameter of the filter openings may be 100 to 300 µm, preferably 200 µm, on the upper side of the filter base plate. An optimum filtering effect can be achieved within this diameter range.

The ratio of the thickness of the filter base plate to the diameter or side length of the filter openings is advantageously 1.0 to 3.0, preferably 2.0. In this connection the terms diameter and edge length cover every typical dimension of every filter opening shape that is essential for the size of a filter opening.

To obtain an optimum coffee flavor, it has been found with respect to the presently standard operational pressures of coffee preparing machines, especially of espresso machines, that the sum of the area of the filter openings should advantageously be 3 to 12 $mm^2$, preferably 7 $mm^2$.

A uniform and regular distribution of the filter openings can especially be obtained by arranging the filter openings in the manner of rows and/or columns in the filter base plate relative to one another and, when triangular filter openings are used, the tips may alternatingly be oriented within a row and/or column into opposite directions. A constant fine creaminess of the head or cream can additionally be enhanced by the oppositely directed arrangement of the filter openings.

To ensure an improved and more permanent installation of the frame on the filter base plate, at least one holding opening which is engaged by a holding portion of the frame in a substantially accurately fitting manner is arranged in the edge portion of the filter base plate. With an injection molded frame, plastic material flows into the holding opening during the injection molding operation, whereby the filter base plate is firmly anchored into the frame. In another embodiment, at least one anchoring opening which is engaged by an anchoring portion of the frame in a substantially accurately fitting manner may also be arranged in the inner edge portion of the collar. This guarantees an exact adhesion of the frame to the collar of the pot wall. The collar and the filter base plate can especially be interconnected by injection molding if the holding openings of the filter base plate and the anchoring openings of the collar are arranged substantially in alignment with one another. The holding portions of the filter base plate and the anchoring portions of the frame are then also arranged one on top of the other and jointly position the collar and the filter base plate substantially in an accurately fitting manner.

In another embodiment the holding openings of the filter base plate are substantially arranged inside the opening portion which is enclosed by the inner edge portion of the collar. As a result, the filter base plate can be made smaller because the holding openings and the anchoring openings need not be congruent. This reduces the costs for the filter base plate. A substantially uniform fastening of the filter base plate and of the collar inside the frame is achieved in that the holding openings and/or the anchoring openings are provided substantially in the form of a surrounding perforated rim in the edge portion of the filter base plate and/or the inner edge portion of the collar. To enable the filter base plate and the collar to get, so to speak, hooked with one another in the frame in another embodiment, the holding openings and/or the anchoring openings are formed to be at least partly open towards the edge of the filter base plate and/or the inner edge of the collar.

To achieve a substantially smooth transition from the frame towards the pot wall, the frame can surround the collar in a substantially complete manner and rest on the pot wall at least in portions in a positive manner. Undercuts which might lead to an unintended accumulation of ground coffee residues are avoided by this measure. Moreover, the fastening element on the pot wall is completely integrated into the frame, i.e., it is not visible from the outside, which creates an esthetically pleasant impression.

In another preferred embodiment the collar has a surrounding step into which the frame is fitted at least partly in a substantially tight manner. Hence, there is also the possibility that even frames and filter plates of a complicated structure are first interconnected in an injection molding process and are then pressed into the step on the collar without requiring an additional injection molding operation.

To withstand the pressure acting on the filter base plate to a greater degree, the filter base plate may be arranged in the frame such that it is slightly convexly curved in a direction opposite to the flow direction. Increased stability is thereby imparted to the filter base plate. Moreover, this has the advantage that in the state where the frame is pressed into a surrounding step on the collar the connection between frame and collar is again reinforced when the filter base plate is subjected to pressure. It should be noted that the sealing effect on the surrounding step is thereby increased as well.

Another increase in the sealing effect in the pressed-in state of the frame can be achieved in that at least in the vertical area of the step at least one surrounding sealing groove is arranged that is engaged by circumferential portions of the frame in a substantially positive manner.

Part of the frame material can penetrate into the sealing grooves and thereby improve sealing because of the fact that the frame is pressed in and because of the forces resulting therefrom on the surfaces of the step and of the frame.

It has been found to be an especially simple method for producing fine-pored permanent filter inserts when the filter base plate consists of metal and is produced by electrolytic metal deposition or punching or etching. In accordance with the required accuracy, a corresponding method can then be chosen for producing, e.g., triangular filter openings under relatively small efforts and at quite accurate dimensions. To impart an especially high stability to the filter base plate, an embodiment may also be chosen in which the frame comprises reinforcing struts which extend along the bottom side of the filter base plate and are in contact therewith. The frame may also comprise reinforcing struts which extend along the upper side of the filter base plate and are in contact therewith. When the permanent filter insert is subjected to pressure, these reinforcing struts support the relatively thin filter base plate, thereby preventing excessive sagging thereof.

Circular filter inserts in which the filter base plate and the frame have a substantially circular shape have turned out to be especially expedient forms for such permanent filter inserts, especially for use in an espresso machine. With specific shapes of permanent filter inserts, however, it may be advantageous when the filter base plate has the shape of a polygon, preferably of a hexagon or octagon, because the area can thus be exploited in an improved manner.

Embodiments of the present invention will now be explained in more detail hereinbelow with reference to a drawing, in which:

FIGS. 3 and 3b show a first embodiment of a filter base plate in a diagrammatic top view and partly cut side view;

FIG. 3a is a top view on a first embodiment of a filter opening on an enlarged scale;

FIG. 4 shows a top wall similar to the one in FIG. 1 in a bottom view and in full section;

FIG. 5 shows an embodiment of a first variant of holding and anchoring openings on an enlarged scale;

FIG. 9 shows a second embodiment of a permanent filter insert according to the invention;

Figure 1:
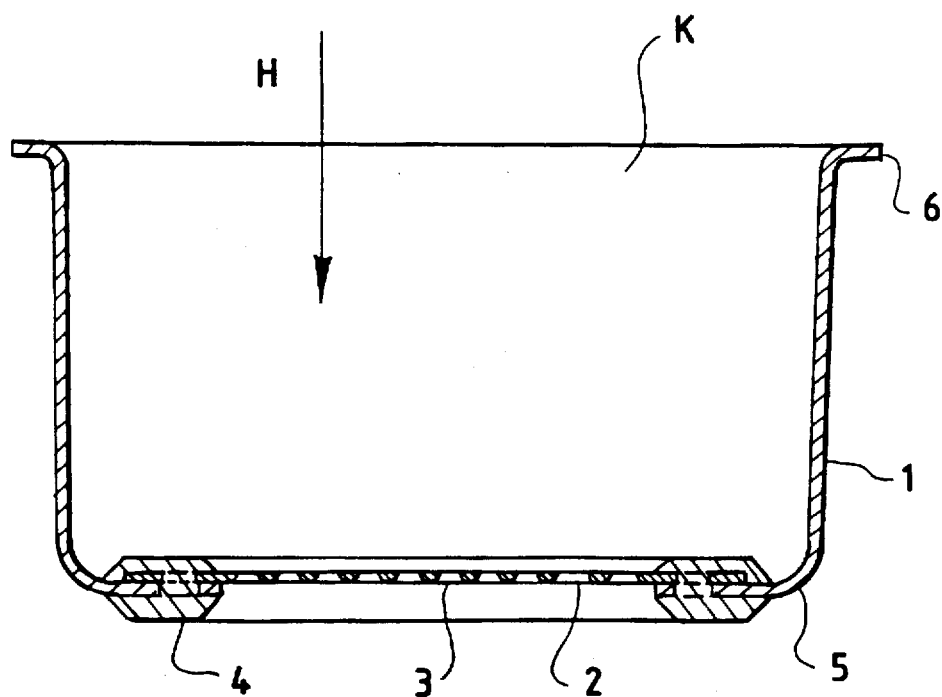
FIG. 1 shows a first embodiment of the present invention in half section.

According to the embodiment illustrated in FIG. 1, the pot-shaped permanent filter insert according to the invention consists essentially of a pot wall 1 and a filter base plate 2 which substantially forms the bottom of the pot. In the figures, the permanent filter insert according to the invention has a circular shape which, however, should only be regarded as an advantageous embodiment. The filter base plate 2 is penetrated by a plurality of filter openings 3. The filter base plate 2 consists preferably of a metal, whereas an annular frame 4 which encompasses the filter base plate 2 consists of a plastic material which has been injection-molded onto the filter base plate 2. The pot wall 1 of FIG. 1 is made from metal, preferably stainless steel, and is provided on its lower edge portion with a surrounding collar 5 oriented towards the axis of the pot. Collar 5 engages into the frame 4 made of plastics and serves there as a fastening element to be fastened thereto.

Figure 2:
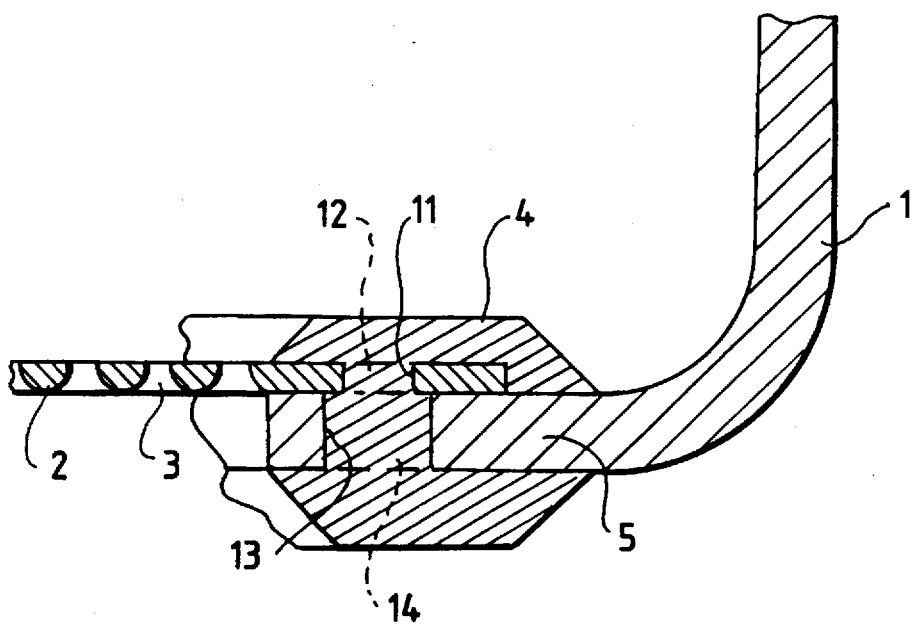
FIG. 2 shows a first variant of a connection point between pot wall and filter base plate.
Figure 2A:
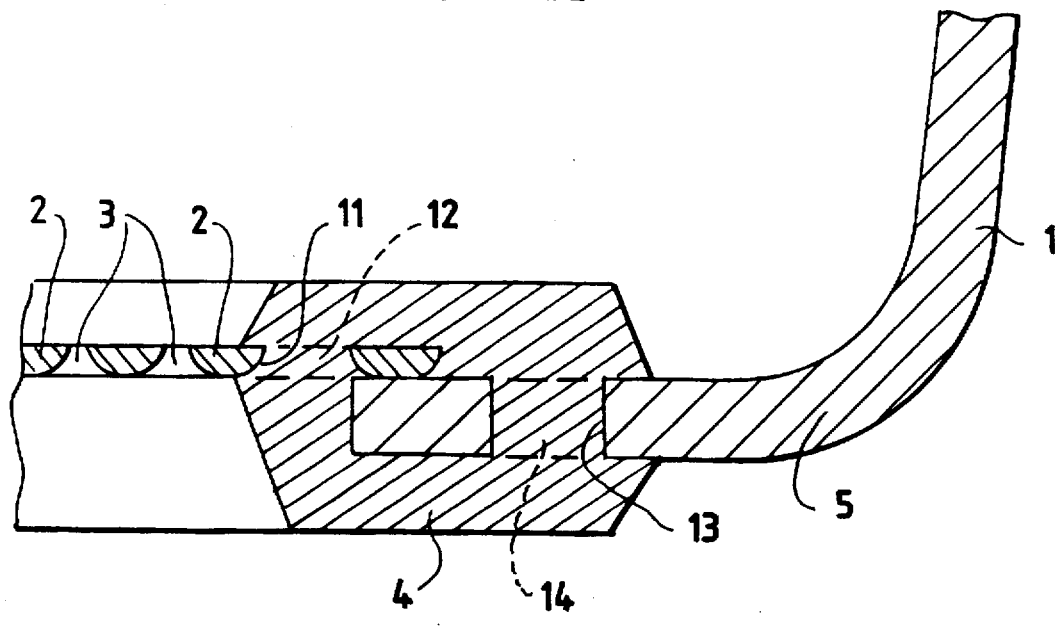
FIG. 2a shows a second variant of a connection point between pot wall and filter base plate.
Figure 2B:
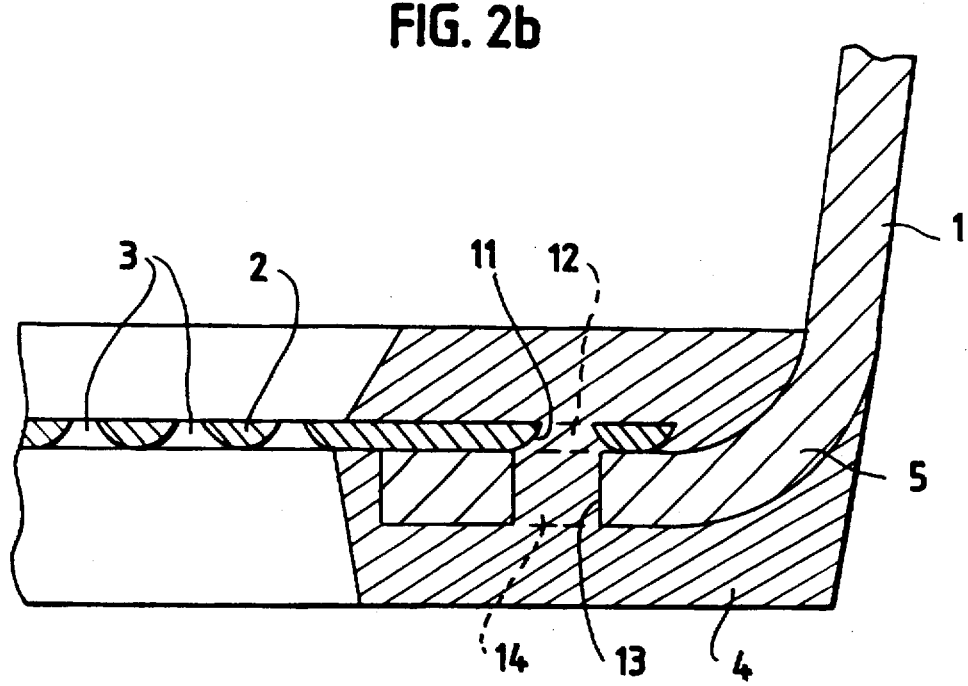
FIG. 2b shows a third variant of a connection point between pot wall and filter base plate.

As becomes especially apparent from FIGS. 2 to 7, holding openings 11 which are engaged by holding portions 12 of the frame in an accurately fitting manner are arranged in the edge portion of the filter base plate 2. The holding openings 11 and the anchoring openings 13 are provided in the form of a surrounding perforated rim in the edge portion of the filter base plate 2 and of the inner edge portion of collar 5. As can be seen in FIGS. 2, 2b and 5, the holding openings 11 of the filter base plate 2 and the anchoring openings 13 of the collar 5 are arranged at least partly in substantial alignment with one another. Even if only specific holding openings 11 and anchoring openings 13 are superimposed due to nonuniform division, this will suffice for securing the filter base plate 2 and the collar 5 in a satisfactory manner in frame 4. According to FIG. 2a, however, it is also possible to arrange the holding openings 11 of the filter base plate 2 substantially within the opening portion enclosed by the inner edge portion of collar 5. In this case the filter base plate 2 will only rest with part of the edge portion on collar 5, and the holding portion 12 is substantially arranged to adjoin the free end of collar 5. Since the partial circle of the perforated rim of the holding openings 11 is smaller than the partial circle of the perforated rim of the anchoring openings 13, the filter base plate 2 can be produced with a reduced diameter, whereby material costs can be saved.

Figure 12:
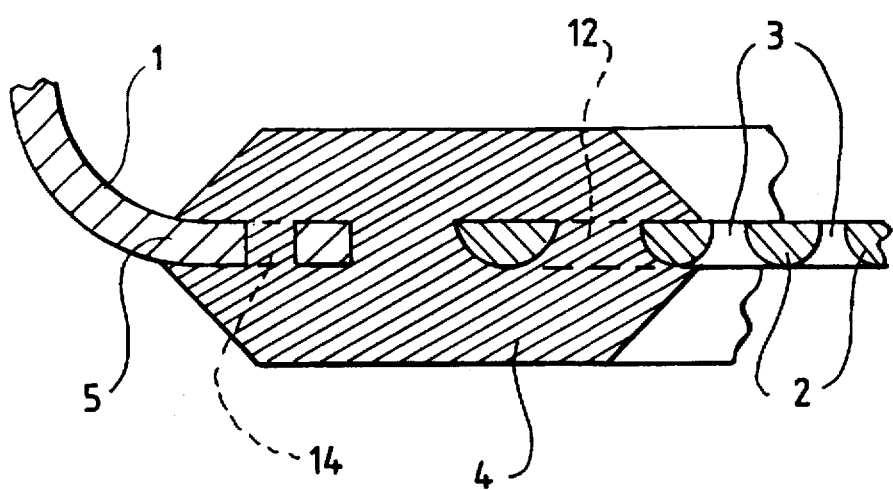
FIG. 12 shows a fourth variant of a connection point between pot wall and filter base plate.

FIG. 12 shows another variant of a connection point between pot wall 1 and filter base plate 2. Collar 5 and filter base plate 2 are arranged within frame 4 at the same level, so that the filter base plate 2 is arranged in the opening area enclosed by the inner edge portion of collar 5. The necessary diameter of filter base plate 2 is once again reduced by such an arrangement.

Figure 6:
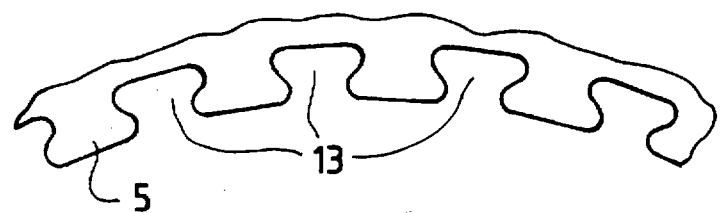
FIG. 6 shows a second variant of anchoring openings.
Figure 7:
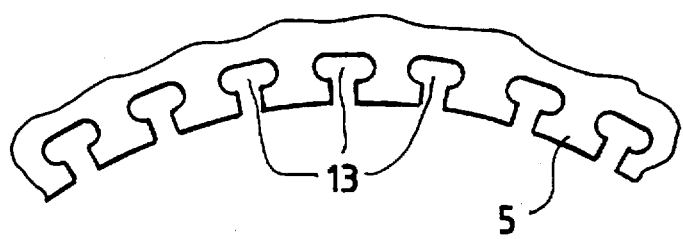
FIG. 7 shows a third variant of anchoring openings.

FIGS. 6 and 7 shows another variant of anchoring openings 13, which, however, can easily be transferred to the holding openings 11 of the filter base plate 2. The anchoring openings 13 are accordingly formed to be open towards the inner edge of collar 5. The holding openings 11 would then be formed accordingly, i.e., they would be open towards the edge of the filter base plate 2. Collar 5 and filter base plate 2 can be hooked in an even improved manner in plastic frame 4 owing to this design. A preferred length of holding and anchoring openings 11, 13 may be 2 to 4 mm, at a respective distance from the edge and from one another of from 1.5 to 2 mm. The width of the slot may preferably be designed to be 1.5 to 2 mm.

With such designs it is possible to interconnect the filter base plate 2 and pot wall 1 by means of an injection molding process in which frame 4 is connected by injection molding. The pot wall is also provided on its upper edge portion with a surrounding flange 6 which is oriented outwards and which serves improved retainment in the coffee preparing machine.

In these embodiments of the present invention it is also possible to produce a pot-shaped permanent filter insert whose filter base plate 2 may have any desired shape provided frame 4 is capable of establishing a connection between pot wall 1 and filter base plate 2.

Figure 8A:
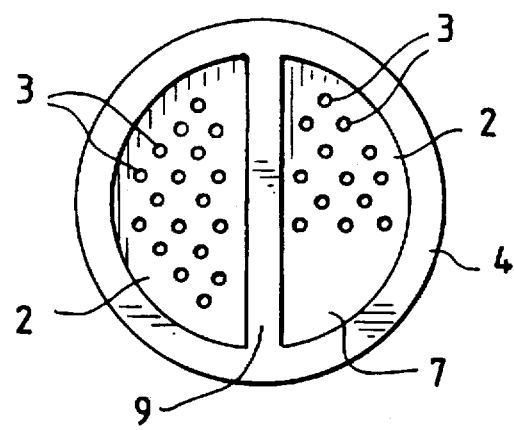
FIG. 8a is a bottom view of a filter base plate variant with frame.
Figure 8B:
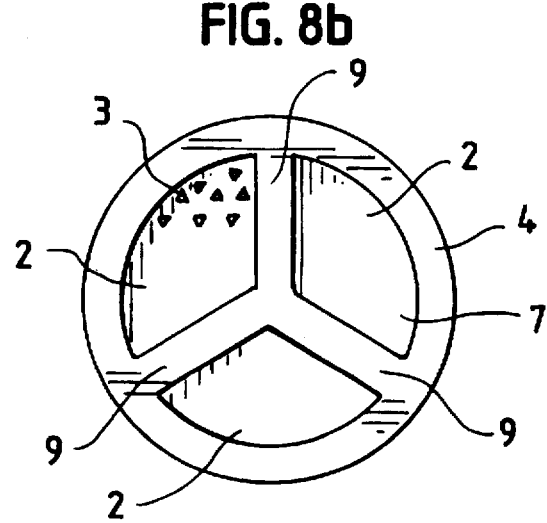
FIG. 8b is a bottom view of another filter base plate variant with frame.

An advantageous embodiment of a filter base plate 2 will now be described in more detail, especially with reference to FIGS. 3, 3a, 8a and 8b. The filter base plate 2 preferably consists of a metal, whereas frame 4 is made from a plastic material which has been injection molded onto the filter base plate 2. Furthermore, frame 4 comprises reinforcing struts 9 which extend along the bottom side 7 of the filter base plate 2 and which, as shown in FIG. 8a, are arranged such that the filter base plate 2 comprises two passage sectors or, as shown in FIG. 8b, are arranged such that filter base plate 2 comprises three passage sectors. The reinforcing struts 9 are also injection-molded onto the filter base plate 2 so that they get partly hooked in the filter openings 3 covered by them. It is also possible to arrange reinforcing struts 9 along the upper side 8 of the filter base plate 2. Furthermore, as already mentioned above, the holding openings 11 ensure that the filter base plate 2 is secured within frame 4 in an accurate position and in a rotation- and torsion-proof manner. As shown in FIG. 8a, the filter openings 3 may have a circular shape when viewed in cross-section or, as shown in FIG. 8b, may have a triangular shape. The filter openings 3 become larger in the manner of a funnel from the upper side 8 of the filter base plate 2 in flow direction A towards bottom side 7. The lateral surfaces 10 of the filter openings 3 are curved in the manner of an arc, whereby a kind of diffusor shape is created. The angle of exit of the lateral surfaces 10 of the filter openings 3 is at least 90° at the bottom side 7 of the filter base plate 2.

As can especially be seen in FIG. 3, the filter openings 3 are arranged in the manner of rows and columns in the filter base plate 2 relative to one another. With a triangular cross-section, the tips of the triangular filter openings 3 alternately face within a column into opposite directions. The tips of filter openings 3 may also be oriented alternately into opposite directions when arranged in a row. Other forms for the filter openings 3 are lens-like or drop-like forms.

The filter base plate 2 consists of metal which has been deposited onto a corresponding form electrolytically or has been produced by way of punching or etching. Such processes ensure an extremely high accuracy to shape of the filter base plate 2 and of the filter openings 3. The corners of the filter openings 3 can be made especially sharp-edged or pointed, in particular by way of electrolytic deposition and etching. The filter openings 3 have preferably the shape of an equilateral triangle, the side length a being 50 to 300 µm, preferably about 200 µm. Thickness b of the filter base plate 2 is 0.1 to 1 mm, preferably 0.4 mm. With circular filter openings 3, the diameter on the upper side 8 of the filter base plate 2 is 100 to 300 µm, preferably 200 µm. The ratio of thickness b of the filter base plate 2 to the diameter or the side length a of the filter openings 3 is 1.0 to 3.0, preferably 2.0. The sum of the areas of the filter openings 3 of the filter base plate is from 3 to 12 mm$^2$, preferably 7 mm$^2$.

In the variant of FIG. 2b, the frame 4 may enclose collar 5 substantially completely and may rest, at least in portions, positively on the pot wall 1. This prevents undercuts that might lead to accumulations of ground coffee, especially in the interior of the pot. Moreover, a smooth transition between pot wall 1 and frame 4 is thereby created on the exterior wall.

Figure 10:
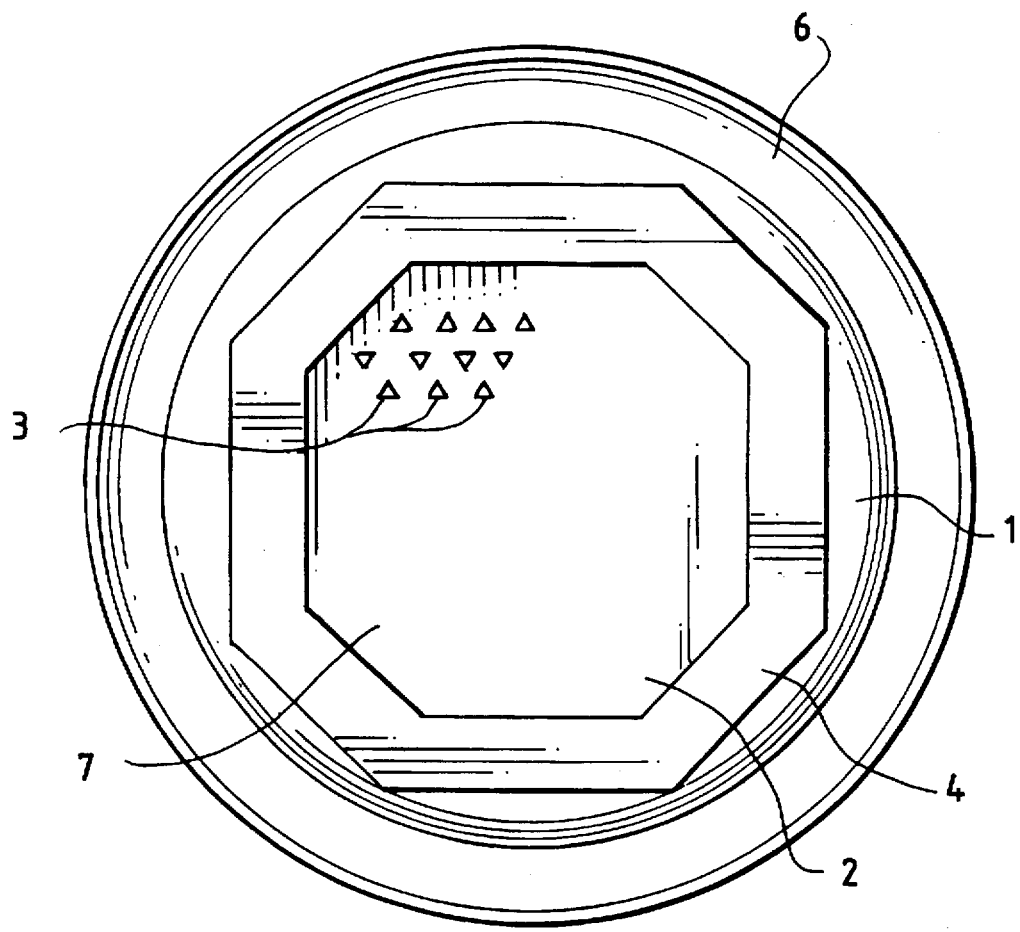
FIG. 10 is a bottom view of a third embodiment of a permanent filter insert according to the invention.

The filter base plates 2 which are shown in the figures are just to be understood as examples because any kind of filter base plate arrangement can be used according to the invention. FIG. 10, for instance, illustrates a filter base plate 2 which has an octagonal shape. The frame 4 is then also given an octagonal shape. Such a design may be of advantage if a circular filter plate whose diameter corresponds to the width of the octagonal filter base plate 2 is to be increased. The area can thereby be increased considerably. Any other polygonal shape, such as a hexagon, is also possible.

It should here be noted that the lower edge portion of pot wall 1 and the filter base plate 2 can be interconnected by way of a die-casting connection of metal, preferably of aluminum or zinc die casting. The pot wall 1 can also be produced in a metal die casting process and may consist of metal, preferably of aluminum or zinc or the alloys thereof. Other possible connections of the lower edge portion of pot wall 1 and of the filter base plate 2 are connections formed by welding, adhesion, rolling, soldering or bending.

The function of the embodiment of the inventive permanent filter insert as shown in FIG. 1 shall briefly be explained now. The pot-shaped permanent filter insert is inserted at the intended place of a coffee preparing machine, with flange 6 coming into contact with a support surface of the machine. The ground coffee is filled into the coffee receiving portion K, so that it rests on the upper side 8 of the filter base plate 2. After water has been heated to the desired temperature, it is pressed through the ground coffee layer and then through the filter base plate 2. The dimensions chosen for the filter openings 3 are so small that no objectionable powder particles can pass through the openings. The diffusor effect of the filter openings 3 creates swirls which create a head or cream of fine foam which after an espresso has e.g. been made will be located on the surface of said espresso. Moreover, there is no risk of clogging because of the shape of the filter openings 3 which gets larger in flow direction A.

The second embodiment according to FIG. 9 shall now be referred to. It is only the differences with respect to the first-mentioned embodiment that will be described. Identical reference numerals are used for identical or similar components.

In this embodiment, frame 4 is integrally formed with the lower end portion of pot wall 1 from a plastic material. The filter base plate 2 is just provided with a frame 4 in a single injection-molding process and with a pot wall 1 integrally connected thereto. Like with the first embodiment, plastic material flows in an injection-molding process into the holding opening 11 and anchoring opening 13 which respectively form the holding and anchoring portions 12, 14. Collar 5 and filter base plate 2 are then so to speak anchored in frame 4 of pot wall 1. A separate manufacture of pot wall 1 can be dispensed with in this embodiment.

Figure 11:
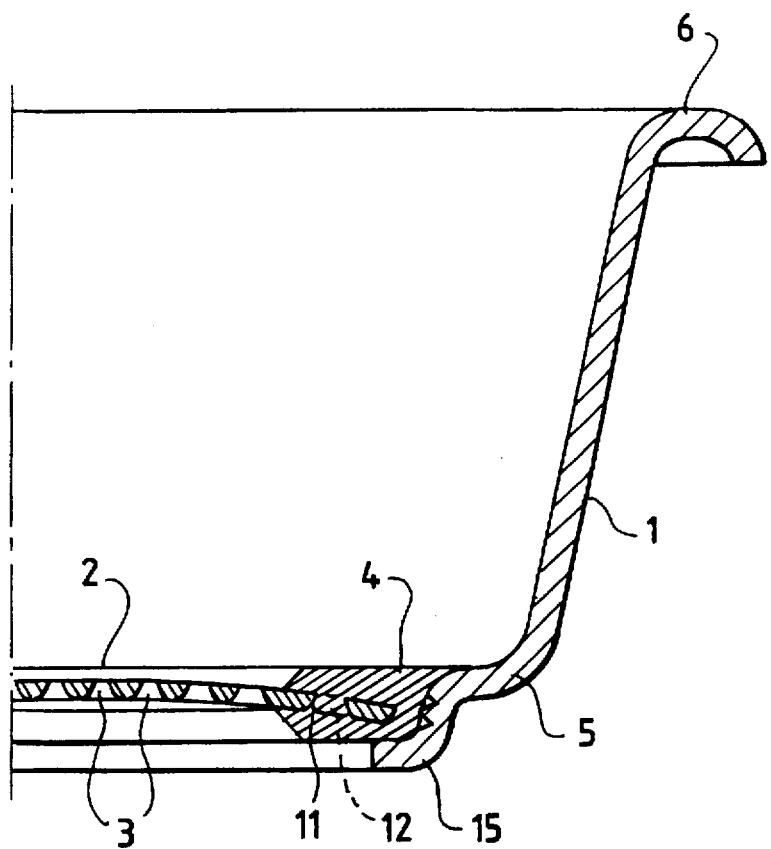
FIG. 11 shows a schematic half section of a fourth embodiment of the present invention.
Figure 11A:
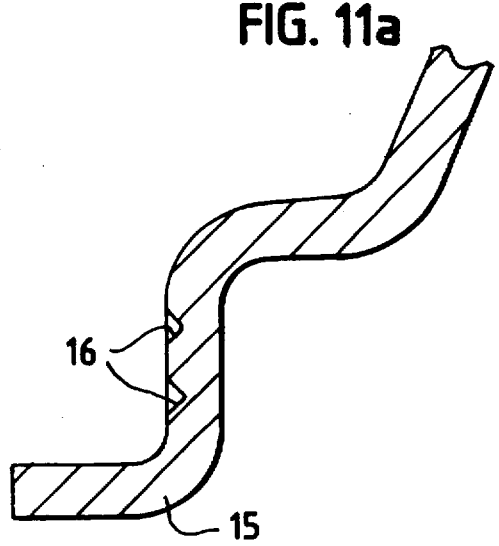
FIG. 11a shows an embodiment of a lower end portion of the top wall in an enlarged schematic illustration.

The fourth embodiment according to FIGS. 11 and 11a shall now be referred to. The differences as to the first-mentioned embodiment shall only be described. Identical reference numerals are used for identical or similar components.

The collar 5 of this embodiment has a surrounding step 15 which provides a snug fit for frame 4 in which the frame is substantially tightly fitted thereinto. This joining technique has the advantage that it is possible to dispense with an arrangement of the pot wall 1 where the pot wall 1 is correctly positioned within an injection mold for connecting filter base plate 2 and pot wall 1. Furthermore, the filter base plate 2 is arranged within frame 4 such that it is slightly convexly curved in a direction opposite to the flow direction A. This has the effect that the filter base plate 2 has increased stability as to pressure application in flow direction A. Furthermore, frame 4 is pressed outwardly against the vertical part of step 15 by exerting pressure onto the filter base plate 2. This reinforces the seat of frame 4 in step 15 and improves sealing. To enhance the sealing effect, the vertical portion of step 15 has arranged therein surrounding sealing grooves 16 which are substantially positively engaged by part of the circumferential portion of frame 4. Especially with a plastic frame 4, this is done quite automatically by the prevailing press power by pressing part of the plastic material into the sealing grooves 16.

In some figures, only part of the filter openings 3 are shown for the sake of simplification. It goes without saying that the remaining surface of the filter base plate 2 may also be penetrated by filter openings 3.

We claim:

1. An improved pot-shaped permanent filter insert for use in an espresso machine, comprising a filter base plate (2) which substantially forms the bottom of the pot and which is penetrated by a plurality of filter openings substantially in flow direction (A) of the medium to be filtered, a frame (4) which surrounds said filter base plate, and a pot wall (1) which is substantially arranged on the edge of said filter base plate (2) and which extends transversely away from said filter base plate (2) to form a coffee receiving portion (K), said permanent filter insert being made of several parts in that the lower edge portion of said pot wall (1) is substantially secured to the outer edge of said filter base plate (2), the improvement comprising that said lower edge portion of said pot wall (1) and said filter base plate (2) are interconnected by an injection-molded plastic connection, with said frame (4) being injection molded substantially around the outer edge of said filter base plate (2), interconnecting said frame (4) and said filter base plate (2) and said pot wall (1).

2. A permanent filter insert according to claim 1, wherein said lower edge portion of said pot wall (1) and said filter base plate (2) are interconnected by way of a metal die-casting connection.

3. A permanent filter insert according to claim 1, wherein said lower edge portion of said pot wall (1) and said filter base plate (2) are interconnected by way of welding, adhesion, rolling, soldering or bending.

4. A permanent filter insert according to claim 1, wherein said lower edge portion comprises at least one fastening element to be received within said frame (4).

5. A permanent filter insert according to claim 4, wherein said fastening element is in the form of a collar (5) which extends around the lower edge portion of said pot wall (1) and is oriented towards the axis of the pot.

6. A permanent filter insert according to claim 1, 2, 3, 4, or 5, wherein said pot wall (1) is made of metal.

7. A permanent filter insert according to claim 1, wherein said pot wall (1) is made in a metal die-casting process and consists of metal.

8. A permanent filter insert according to claim 1, wherein said pot wall (1) consists of a plastic material.

9. A permanent filter insert according to claim 7 or 8, wherein said pot wall (1) and said frame (4) are made integral.

10. A permanent filter insert according to claim 1, wherein said filter openings (3) have a triangular shape when viewed in cross-section.

11. A permanent filter insert according to claim 10, wherein said filter openings (3) have the shape of an equilateral triangle.

12. A permanent filter insert according to claim 1, wherein said filter openings (3) have a circular shape when viewed in cross-section.

13. A permanent filter insert according to claim 1, wherein said filter openings (3) have substantially the shape of a lens or drop.

14. A permanent filter insert according to claim 1, wherein said filter openings (3) become larger in funnel-like manner from the upper side (8) of said filter base plate (2) in flow direction (A) to the bottom side (7) of said filter base plate (2).

15. A permanent filter insert according to claim 14, wherein the angle of exit of the lateral surfaces (10) of said filter openings (3) is at least 90° at the bottom side (7) of said filter base plate (2).

16. A permanent filter insert according to claim 15, wherein said lateral surfaces (10) of said filter openings (3) are bent into an arcuate shape.

17. A permanent filter insert according to claim 1, wherein the side length (a) of said filter openings (3) is 50 to 300 μm at the upper side (8) of said filter base plate (2).

18. A permanent filter insert according to claim 1, 10, 12, 14, 15, or 16, wherein the diameter of said filter openings (3) is 100 to 300 μm at the upper side (8) of said filter base plate (2).

19. A permanent filter insert according to claim 1, wherein said filter base plate (2) has a thickness of from 0.1 to 1 mm.

20. A permanent filter insert according to claim 17, wherein the ratio of thickness (b) of said filter base plate (2) to the diameter of side length (a) of said filter openings (3) is 1.0 to 3.0.

21. A permanent filter insert according to claim 1, wherein the sum of the areas of said filter openings (3) of said filter base plate (2) is 3 to 12 mm$^2$.

22. A permanent filter insert according to claim 10, wherein said filter openings (3) are arranged relative to one another in said filter base plate (2) in the manner of rows and/or columns.

23. A permanent filter insert according to claim 22, wherein the tips of said triangular filter openings (3) are alternately oriented within a row and/or column into opposite directions.

24. A permanent filter insert according to claim 1, wherein at least one holding opening (11) which is engaged by a holding portion (12) of said frame (4) substantially in an accurately fitting manner is arranged in the edge portion of said filter base plate (2).

25. A permanent filter insert according to claim 24, wherein at least one anchoring opening (13) which is engaged by an anchoring portion (14) of said frame (4) substantially in an accurately fitting manner is arranged in the inner edge portion of said collar (5).

26. A permanent filter insert according to claim 25, wherein said holding openings (11) of said filter base plate (2) and said anchoring openings (13) of said collar (5) are arranged at least partly substantially in alignment with one another.

27. A permanent filter insert according to claim 24, wherein said holding openings (11) of said filter base plate (2) are arranged substantially inside of said opening portion which is enclosed by the inner edge portion of said collar (5).

28. A permanent filter insert according to claim 25, wherein said holding openings (11) and/or said anchoring openings (13) are provided substantially in the form of a surrounding perforated rim in the edge portion of said filter base plate (2) and/or the inner edge portion of said collar (5).

29. A permanent filter insert according to claims 25, wherein said holding openings (11) and/or anchoring openings (13) are formed to be at least partly open towards the edge of said filter base plate (2) and/or the inner edge of said collar (5).

30. A permanent filter insert according to claim 1, wherein said frame surrounds said collar (5) substantially completely and rests at least in portions positively on said pot wall (1).

31. A permanent filter insert according to claim 1, wherein said collar (5) has a surrounding step (15) into which said frame (4) is fitted at least partly in a substantially tight manner.

32. A permanent filter insert according to claim 1, wherein said filter base plate (2) is arranged to be slightly convexly curved in said frame (4) in a direction opposite to said flow direction (A).

33. A permanent filter insert according to claim 1, wherein at least one surrounding sealing groove (16) which is engaged by circumferential portions of said frame (4) in a substantially positive manner is arranged at least in the vertical portion of said step (15).

34. A permanent filter insert according to claim 1, wherein said filter base plate (2) consists of metal and is produced by way of electrolytic metal deposition or punching or etching.

35. A permanent filter insert according to claim 1, wherein said frame (4) comprises reinforcing struts (9) which extend along the bottom side (7) of said filter base plate (2) and are in contact therewith.

36. A permanent filter insert according to claim 1, wherein said frame (4) comprises reinforcing struts (9) which extend along the upper side (8) of said filter base plate (2) and are in contact therewith.

37. A permanent filter insert according to claim 1, wherein said filter base plate (2) and said frame (4) have substantially a circular shape.

38. A permanent filter insert according to claim 1, wherein said filter base plate (2) has the shape of a polygon.

39. A permanent filter insert according to claim 2, wherein said metal die-casting interconnection comprises aluminum or zinc die castings.

40. A permanent filter insert according to claim 6, wherein said pot wall (1) is made of stainless steel.

41. A permanent filter insert according to claim 7, wherein said metal comprises aluminum, zinc, or alloys thereof.

42. A permanent filter insert according to claim 17, wherein said side length of said filter openings (3) is 200 μm, at the upper side (8) of said filter base plate (2).

43. A permanent filter insert according to claim 18, wherein the diameter of said filter openings (3) is 200 μm, at the upper side (8) of said filter base plate (2).

44. A permanent filter insert according to claim 19, wherein the thickness of said filter base plate (2) is 0.4 mm.

45. A permanent filter insert according to claim 20, wherein said ratio is 2.0.

46. A permanent filter insert according to claim 21, wherein said sum of areas is 7 mm$^2$.

47. A permanent filter insert according to claim 38, wherein said shape of said filter base plate (2) is hexagon or octagon.

* * * * *

UNITED STATES PATENT AND TRADEMARK OFFICE
CERTIFICATE OF CORRECTION

PATENT NO. : 5,715,741
DATED : February 10, 1998
INVENTOR(S) : Ruedi Gasser et al It is certified that error appears in the above-indentified patent and that said Letters Patent is hereby corrected as shown below:

Claim 1, column 8, line 26, after "openings" insert ---(3)---.

Signed and Sealed this

Ninth Day of June, 1998

*Attest:*

BRUCE LEHMAN

*Attesting Officer*     *Commissioner of Patents and Trademarks*